(12) United States Patent
Baldwin et al.

(10) Patent No.: US 9,543,744 B1
(45) Date of Patent: Jan. 10, 2017

(54) SEALED CABLE CONDUIT ELECTRICAL BOX

(71) Applicants: Jeffrey Baldwin, Desert Hills, AZ (US); Ryan Liebengood, Gilbert, AZ (US); John Klein, Gilbert, AZ (US)

(72) Inventors: Jeffrey Baldwin, Desert Hills, AZ (US); Ryan Liebengood, Gilbert, AZ (US); John Klein, Gilbert, AZ (US)

( * ) Notice: Subject to any disclaimer, the term of this patent is extended or adjusted under 35 U.S.C. 154(b) by 0 days.

(21) Appl. No.: 15/062,180

(22) Filed: Mar. 6, 2016

Related U.S. Application Data

(63) Continuation of application No. 14/190,074, filed on Feb. 25, 2014, now Pat. No. 9,312,670.

(60) Provisional application No. 61/775,528, filed on Mar. 9, 2013, provisional application No. 61/807,758, filed on Apr. 3, 2013.

(51) Int. Cl.
*H02G 3/08* (2006.01)
*H02G 3/14* (2006.01)
*H02G 3/22* (2006.01)

(52) U.S. Cl.
CPC . *H02G 3/14* (2013.01); *H02G 3/22* (2013.01)

(58) Field of Classification Search
CPC ............ H02G 3/08; H02G 3/081; H02G 3/22; H02G 3/24; H02G 3/26; H02G 3/28; H02G 3/30; H02G 15/00; H02G 15/003; H02G 15/013; H02G 15/06; H02G 15/10; H02G 15/22; H02G 3/088; H02G 3/086; H02G 3/0608; H01R 13/74
USPC ... 174/50, 520, 60, 480, 481, 559, 560, 564, 174/650, 657, 53, 491, 68.1, 72 C, 68.3, 174/71 R; 220/3.2–3.9, 4.02; 248/68.1, 248/49; 52/220.1, 52/220.5
See application file for complete search history.

(56) References Cited

U.S. PATENT DOCUMENTS

| | | | | |
|---|---|---|---|---|
| 1,254,528 A | * | 1/1918 | Paiste | H01R 4/186 174/71 R |
| 4,875,881 A | * | 10/1989 | Caveny | H01R 13/73 439/535 |
| 5,486,650 A | | 1/1996 | Yetter | |
| 5,770,817 A | * | 6/1998 | Lo | H02G 3/086 174/53 |
| 5,917,982 A | | 6/1999 | Vargas | |
| 5,995,699 A | | 11/1999 | Vargas | |
| 6,262,365 B1 | | 7/2001 | Ewer | |
| 6,342,675 B1 | * | 1/2002 | DeBartolo, Jr. | H02G 3/105 174/481 |
| 6,441,304 B1 | * | 8/2002 | Currier | H02G 3/14 174/50 |
| 6,472,596 B1 | * | 10/2002 | DeBartolo | H02G 3/0608 174/480 |
| 7,183,501 B2 | | 2/2007 | Bowman | |
| 7,285,733 B2 | | 10/2007 | Bowman | |
| 7,385,148 B2 | | 6/2008 | Picard | |
| 7,446,266 B1 | | 11/2008 | Gretz | |
| 7,781,684 B2 | | 8/2010 | Stuckmann | |
| 7,893,362 B2 | * | 2/2011 | Feng | H01R 13/527 174/480 |
| 7,947,901 B2 | | 5/2011 | Leopold | |
| 8,013,242 B1 | | 9/2011 | Thibault | |
| 8,867,235 B2 | | 10/2014 | Veillette | |
| 2012/0037766 A1 | | 2/2012 | Buras, Jr. | |

*Primary Examiner* — Angel R Estrada
(74) *Attorney, Agent, or Firm* — Ryan Liebengood

(57) ABSTRACT

A cable conduit electrical box including a base having at least one opening for receiving a cable conduit, a cover removably attachable to the base, and an adapter removably positioned on the base or the cover for sealing the at least one opening around the cable conduit. A gasket may be positioned between the base and the cover and a gasket may surround the cable conduit.

14 Claims, 13 Drawing Sheets

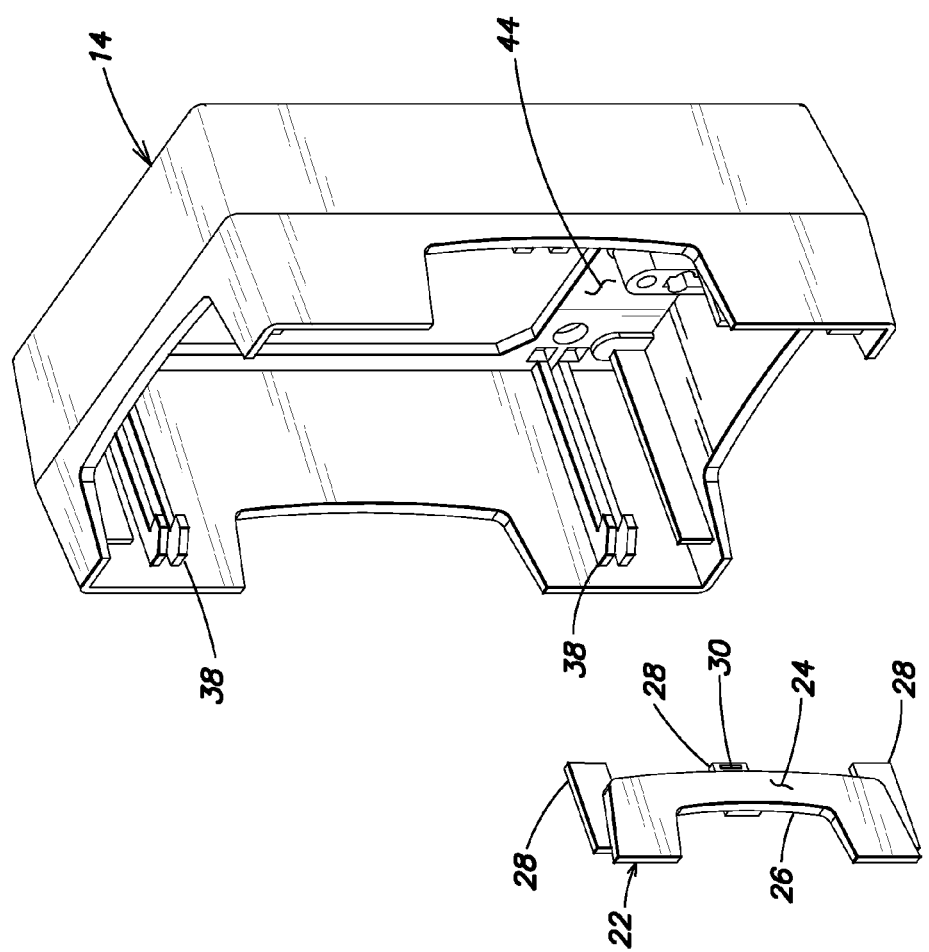

SEALED CABLE CONDUIT ELECTRICAL BOX

CROSS-REFERENCE TO RELATED APPLICATIONS

This application claims priority to U.S. patent application Ser. No. 14/190,074, filed on Feb. 25, 2014, which is currently pending and the disclosure of which is hereby incorporated herein by reference, which claims priority to U.S. Provisional Patent Application No. 61/775,528, filed on Mar. 9, 2013, and U.S. Provisional Patent Application No. 61/807,758, filed on Apr. 3, 2013.

BACKGROUND

1. Technical Field

Aspects of the present disclosure relate generally to cable conduit and more specifically to cable conduit electrical boxes for securing an electrical device which hides line voltage cables and low voltage cables on a wall for a more aesthetically pleasing appearance.

2. Background Art

Electrical cords and plugs are well known and are used to provide electrical current to a number of devices. Modern televisions are light enough to be hung on the wall, yet still need to be connected to an electrical outlet. In new construction, an electrical outlet can be located where a television will ultimately be mounted, yet the majority of households have electrical outlets near the floor. In these instances, the television electrical cable droops from the mounted television to reach the electrical outlet near the floor and creates an unsightly appearance. Further, DVD players, cable boxes, and similar devices which play through the television must be connected to the television with an HDMI cable or other suitable cable. These cables then must be run up the wall and further clutters the television's appearance. In other applications an electrical box may not be properly positioned and a homeowner would then have to cut into the wall and run appropriate electrical wiring behind the wall.

SUMMARY

Aspects of this disclosure relate to an aesthetically pleasing cable conduit and electrical boxes. In one aspect, a cable conduit electrical box including a base having at least one opening for receiving a cable conduit, a cover removably attachable to the base and having a central aperture sized and shaped to receive an electrical device or an electrical switch, and an adapter removably positioned on the base or the cover for sealing the at least one opening around the cable conduit.

In an implementation, the cable conduit electrical box may include a gasket in contact with the cable conduit. The gasket may be composed of a compressible foam. The cable conduit may further include a mounting tab on the base. The mounting tab may include a locking clip. A gasket may be position behind the base. A gasket may be positioned between the base and the cover. The gasket may be positioned adjacent a perimeter of the base and the cover. The gasket may be positioned on an outside surface of the cover. The cable conduit electrical box may further include a rear gasket, a perimeter gasket, a cable conduit gasket, and a forward gasket. The perimeter gasket may be positioned between the base and a mounting tab.

In another aspect, a cable conduit electrical box includes a base having at least one opening for receiving a cable conduit on a wall, a cover removably attachable to the base and having at least one aperture in a side wall and a central aperture sized and shaped to receive an electrical device or an electrical switch, and a gasket removably attached to the at least one aperture to contact the cable conduit.

In an implementation, the gasket may be composed of a foam material. A second gasket may be positioned between the base and the cover. The second gasket may be positioned along an interior perimeter of the base and the cover. The cable conduit electrical box may include a plurality of mounting tabs on the base.

In another implementation, an electrical box includes base having a front side and a rear side, a cover having a front side and a rear side, with a central aperture in the front side shaped and sized to receive an electrical device or an electrical switch, a first gasket positioned on the rear side of the base, a second gasket positioned on a front side of the cover, and wherein the cover is removably secured to the base.

The base may further include a plurality of side walls having at least one aperture in the plurality of side walls. The electrical box may further include a removable adapter arranged to seal the at least one aperture around a cable conduit. The electrical box may further include a mounting tab with a locking clip extending outward from the base at the bottom of the at least one aperture.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments of the present invention will hereinafter be described in conjunction with the appended drawings, where like designations denote like elements, and:

FIG. 5 is a perspective view of the first implementation cable conduit electrical box cover and adapter.

DETAILED DESCRIPTION

This disclosure, its aspects and implementations, are not limited to the specific components or assembly procedures disclosed herein. Many additional components and assembly procedures known in the art consistent with the intended operation and assembly procedures for a cable conduit electrical box will become apparent for use with implementations of a cable conduit electrical box from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of a cable conduit electrical box.

Figure 1:
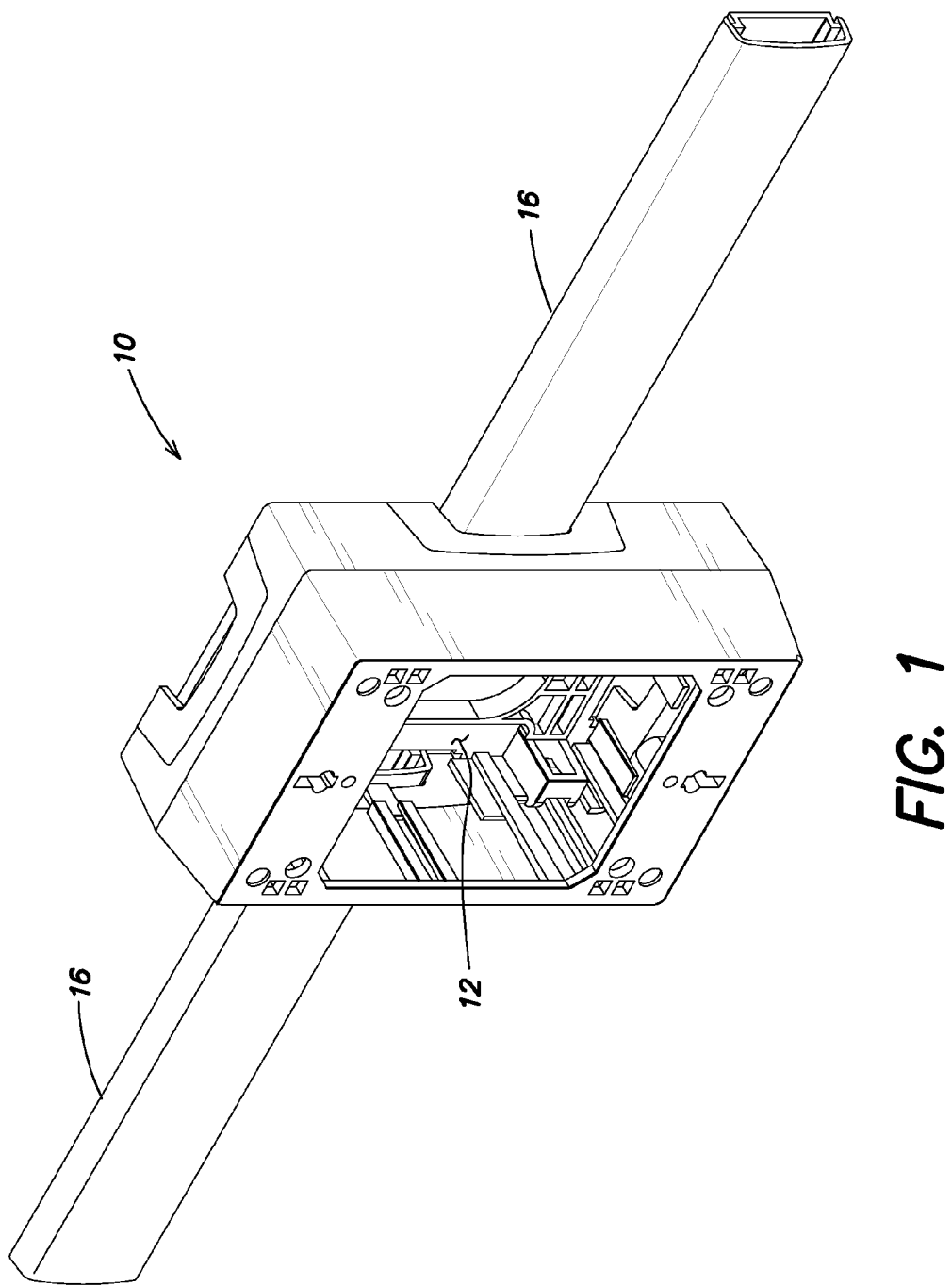
FIG. 1 is a perspective view of a cable conduit electrical box mounted on a wall with cable conduit connected.
Figure 2:
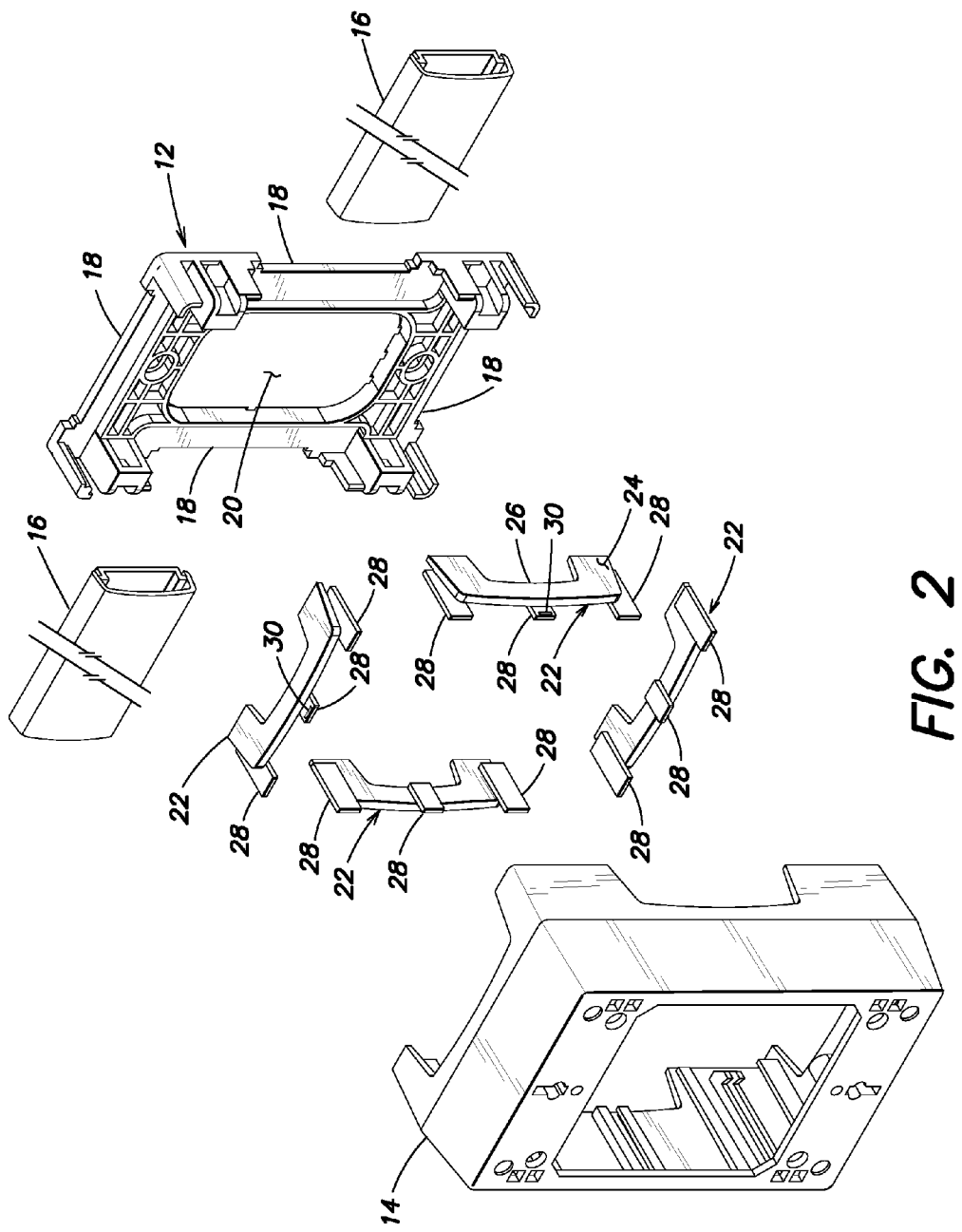
FIG. 2 is an exploded view of a first implementation cable conduit electrical box.

FIGS. 1 through 6 illustrate a first implementation cable conduit electrical box 10 having a base 12 and a cover 14, the cable conduit electrical box 10 arranged to receive cable conduit 16 in connection with the base 12 and cover 14. Referring to FIG. 2, base 10 may include a plurality of base openings 18 and a central opening 20 for receiving an electrical device or other suitable component. Base openings 18 may be positioned on each straight side of base 12 or in any suitable location which is arranged to receive cable conduit 16. The base openings are preferably sized and shaped to receive cable conduit of the largest commercially available size so that the cable conduit electrical box 10 is generally universally sized. Further, base openings 18 are generally recessed within base 12 enough so that the cable conduit 16 end portions may be protected and retained at least partially within the cable conduit electrical box 10. For example, base 12 and cover 14 may be any suitable shape, including, but not limited to, round, square, rectangular, or octagonal. The base 12 may also include various known protrusions for receiving and holding the cover 14 in a snap-like or locking mechanism as will be discussed in greater detail below.

Adapters 22 may be sized to suitably fit within the area of base openings 18, with the adapters 22 having a body 24 and conduit openings 26 of various sizes. The adapters may further include at least one or more adapter tabs 28 and one or more of the adapter tabs 28 may include a locking tab 30. In one implementation, the cable conduit electrical box 10 includes a plurality of adapters 22 with different sizes of conduit openings 26 that are arranged to fit various width and height of cable conduit 16. Further, adapters 22 may include blanks or other suitable filler components that do not include conduit openings 26 for base openings 18 which are not receiving cable conduit 16 to advantageously seal the cable conduit electrical box 10.

Figure 4:
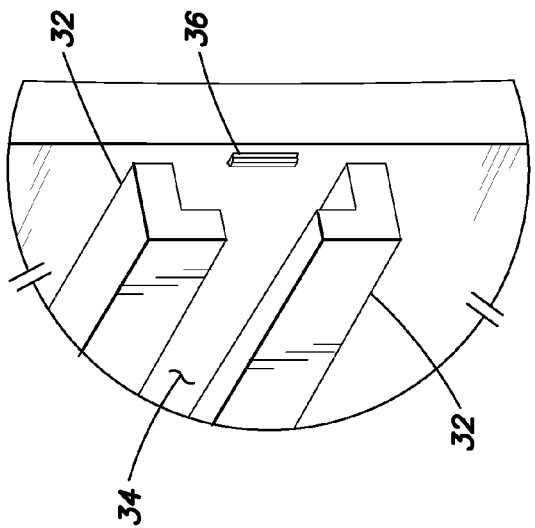
FIG. 4 is an enlarged view of the section labeled A in FIG. 3.
Figure 3:
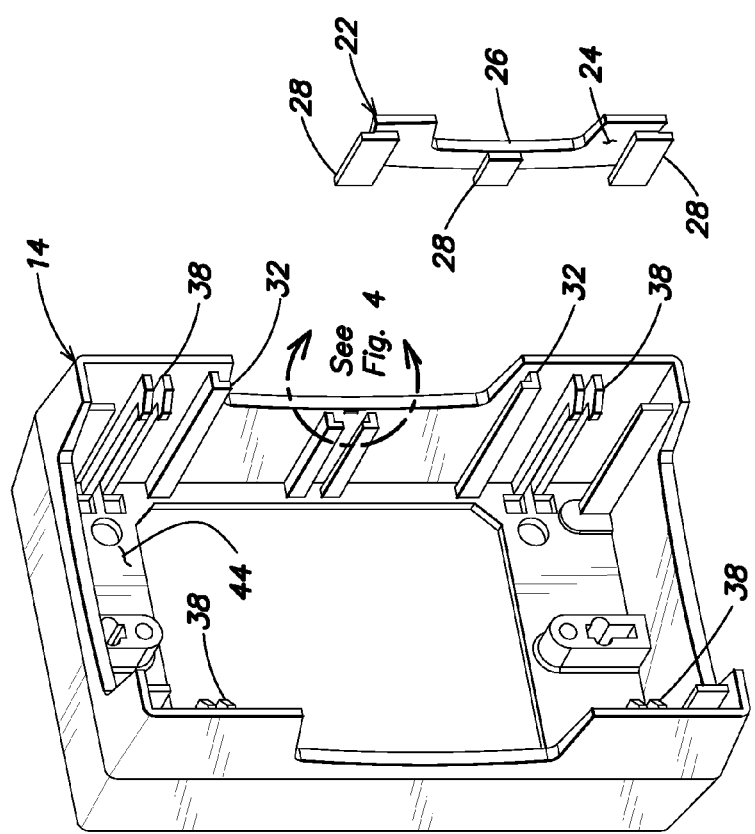
FIG. 3 is a rear view of the first implementation cable conduit electrical box cover and an adapter.
Figure 6:
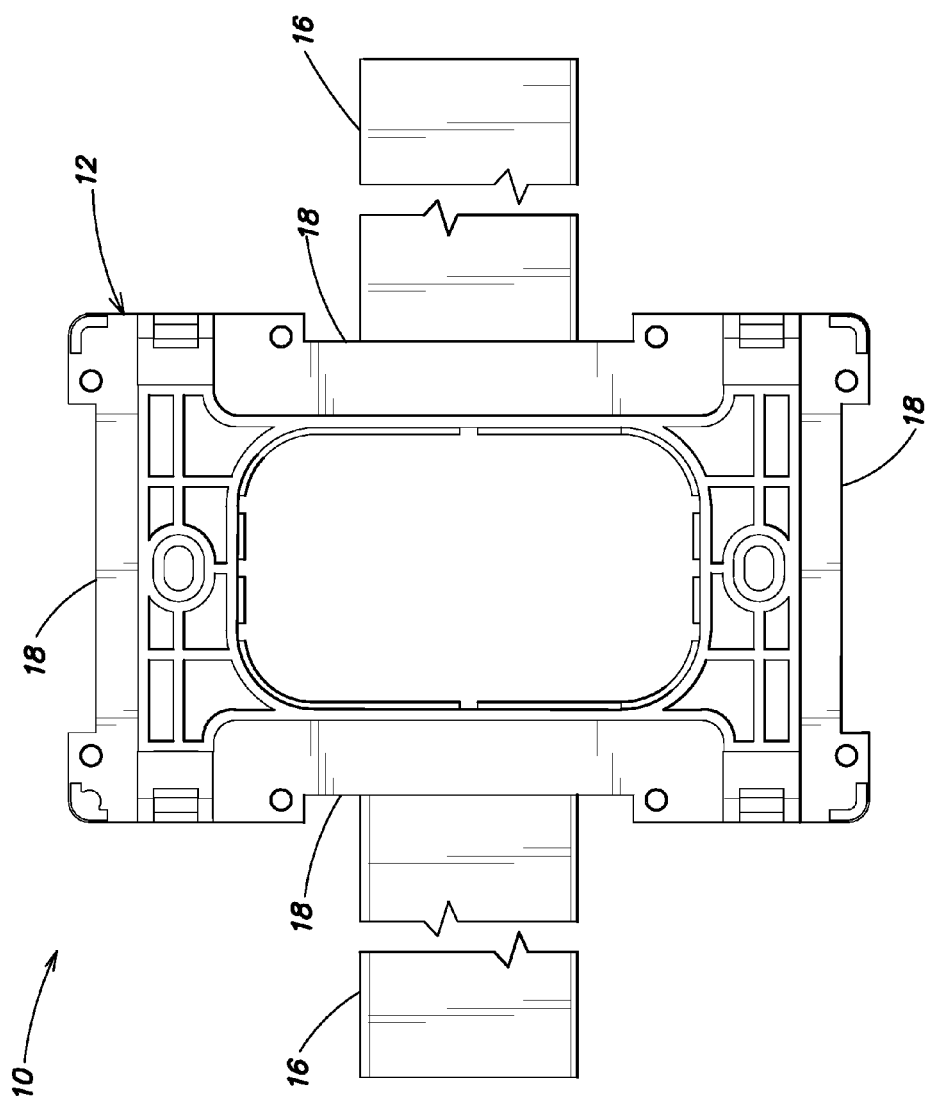
FIG. 6 is a rear view of a cable conduit electrical box with cable conduit connected.

FIGS. 3-5 illustrate various views of cover 14 and an interior cavity 44 with a cover track 32 having a cover track slot 34 and a track locking tab 36. Further, cover connectors 38 are shown which are used to interact with base 12 to removably secure the cover 14 to the base 12. As shown in FIG. 3, cover track slot 34 may include one or more tracks arranged to align with and receive adapters 22 and specifically adapter tabs 28 therein. In the implementation shown, three adapter tabs 28 are shown and three corresponding cover track slots 34 are used to receive the three adapter tabs 28, although any suitable number of mounting tabs may be utilized. The adapters 22, cover tracks 32, and track slots 34 are preferably positioned at each location on base 12 and cover 14 where cable conduit 16 may be positioned. The track slots 34 may also include the locking tab 36 arranged for engagement with adapter locking tab 30 when adapter 22 is positioned within the track slots 34.

As can be envisioned from the illustrations, it is advantageous to first secure base 12 to a wall structure and then cut cable conduit 16 to the appropriate length so that it terminates within base opening 18. With the terminating end of cable conduit 16 positioned within base opening 18, the user then selects an adapter 22 having an appropriately sized adapter conduit opening 26 and the adapter 22 is secured within cover 14 and cover track slot 34 until adapter locking tab 30 engages track locking tab 36. The user will also insert any suitable blank adapters, or those adapters without adapter conduit openings 26 therein and locate the blank adapters in any cover track slots 34 which are not receiving cable conduit 16. The user may then secure the cover 14 to base 12 to thereby enclose the cable conduit electrical box 10 with cable conduit 16 appropriately positioned within the base 12 and cover 14 and sealed from the surrounding environment as can also be seen in FIG. 6.

Figure 7:
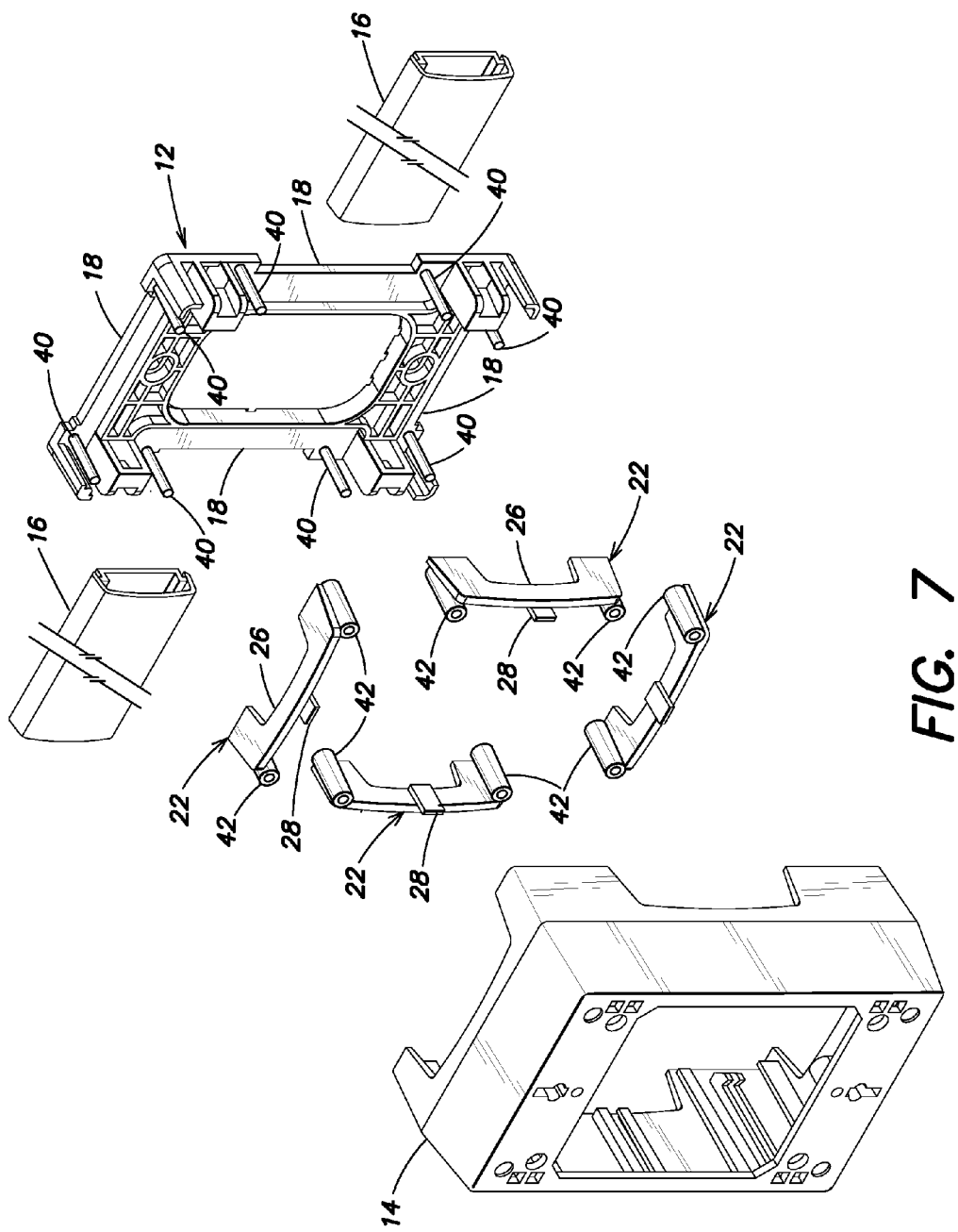
FIG. 7 is an exploded view of a second implementation cable conduit electrical box with adapters.
Figure 8:
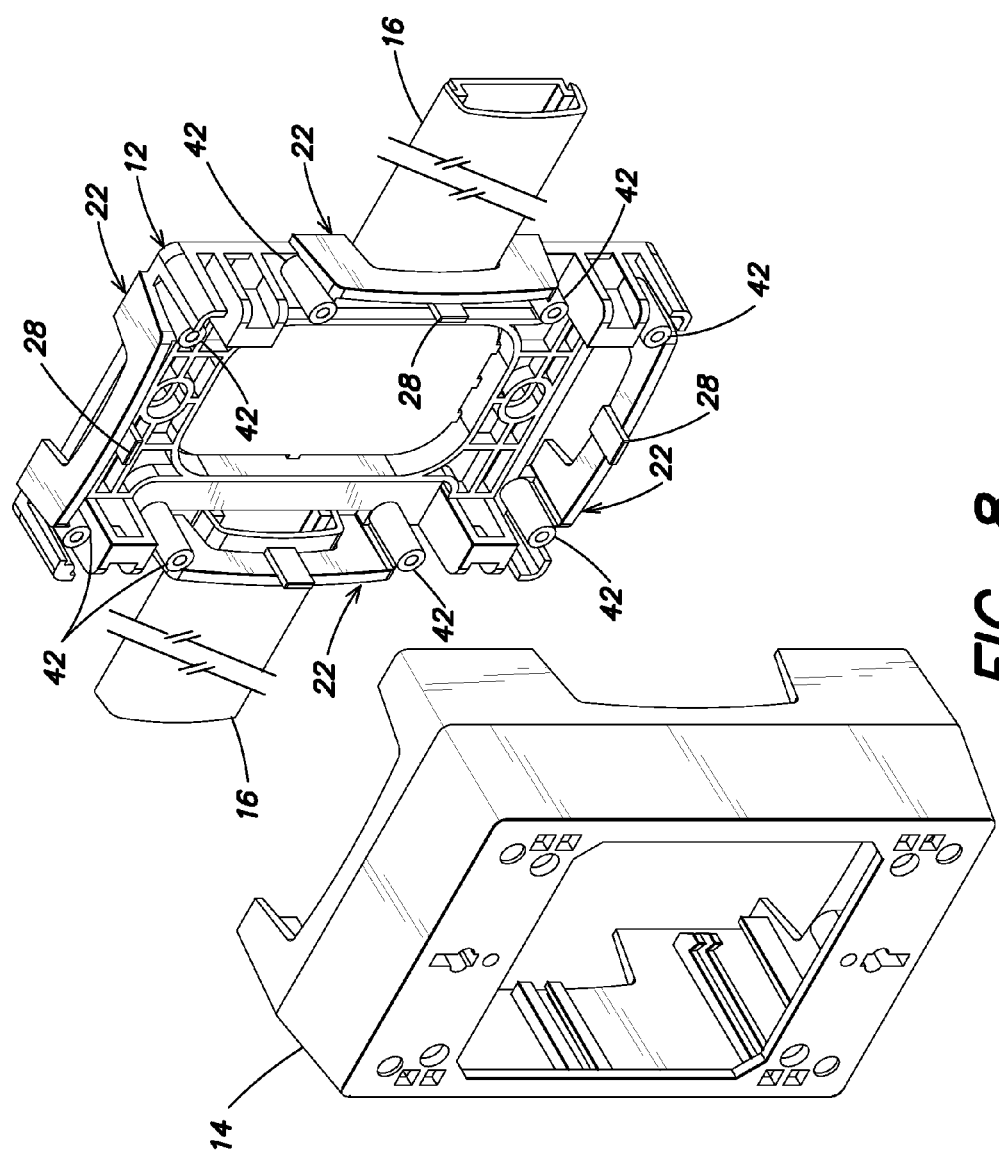
FIG. 8 is a perspective view of the second implementation cable conduit electrical box with the cover separated from the base and adapters.

FIGS. 7 and 8 illustrate another implementation of a cable conduit electrical box 10 having structure similar to the first implementation described above. Immediately noticeable differences are a plurality of mounting pins 40 positioned on base 12 adjacent base openings 18. Specifically, in one application, mounting pins 40 are positioned on each side of each base opening 18 such that, by way of non-limiting example, when four base openings 18 are utilized, there may be 8 mounting pins 40 in base 12. Adapters 22 may also be slightly modified to incorporate body 24 having conduit openings 26 arranged to be selectively sized for various cable conduits 16. The adapters 22 may further include a mounting tab 28 with a locking tab 30 to connect the adapter to cover 14. Specifically, adapters 22 includes one or more adapter mounting apertures 42 which are aligned with and arranged to be securely mated with mounting pins 40 to seal the area around cable conduit 16 and base 18 or the area of base 18 if no cable conduit is utilized. Once again, adapters 22 may include a variety of different conduit openings 26, may be blank (i.e. not have any conduit opening), and/or may have removable portions such that the user can remove any necessary adapter portions and select the appropriate sized conduit opening 26.

While installation is similar to the first implementation, the user may decide to install the adapters on base 12 before installing cover 14 or may select to install the adapters within cover 14 initially. Additionally, the adapter mounting apertures 42 and base mounting pin 40 arrangement allows for better alignment between the base 12, adapters 22, and cover 14 so that an easier installation is achieved.

Figure 9:
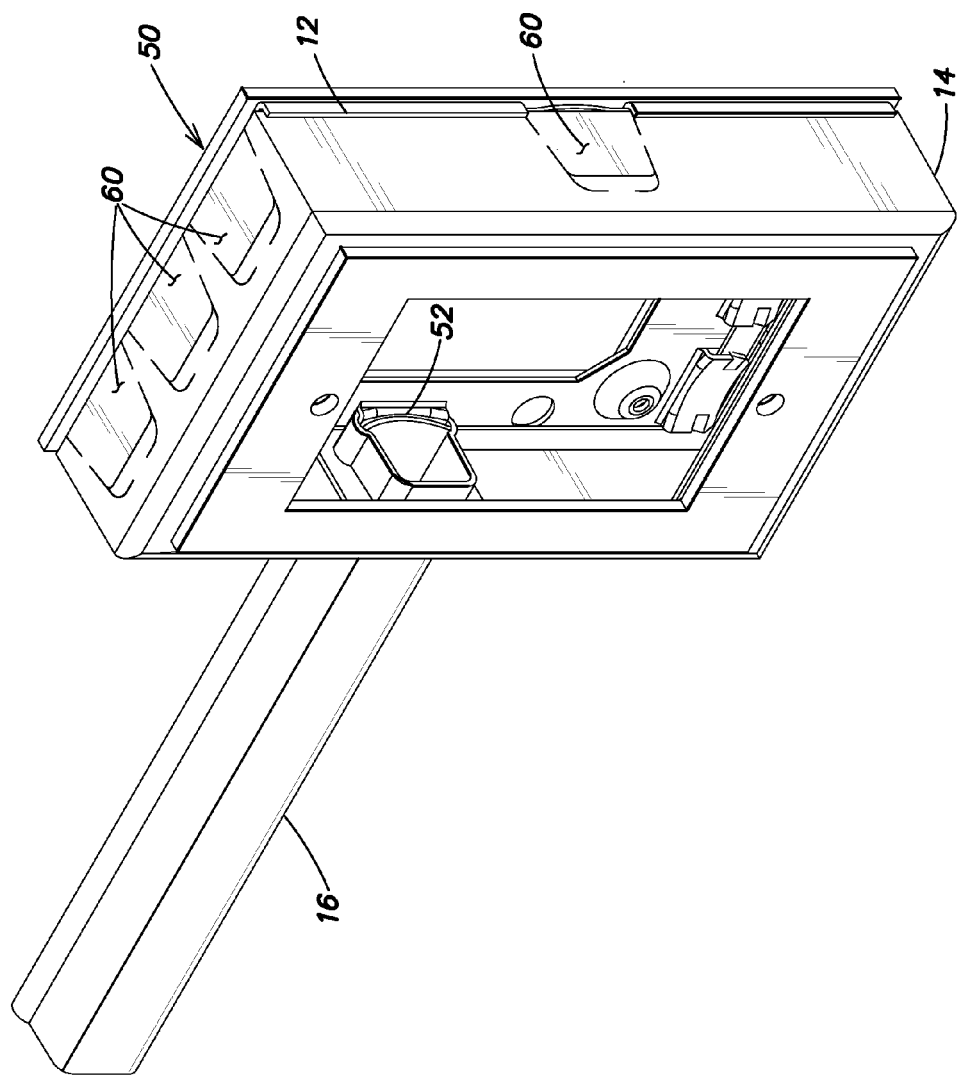
FIG. 9 is a perspective view of a third implementation cable conduit electrical box with cable conduit installed.
Figure 10:
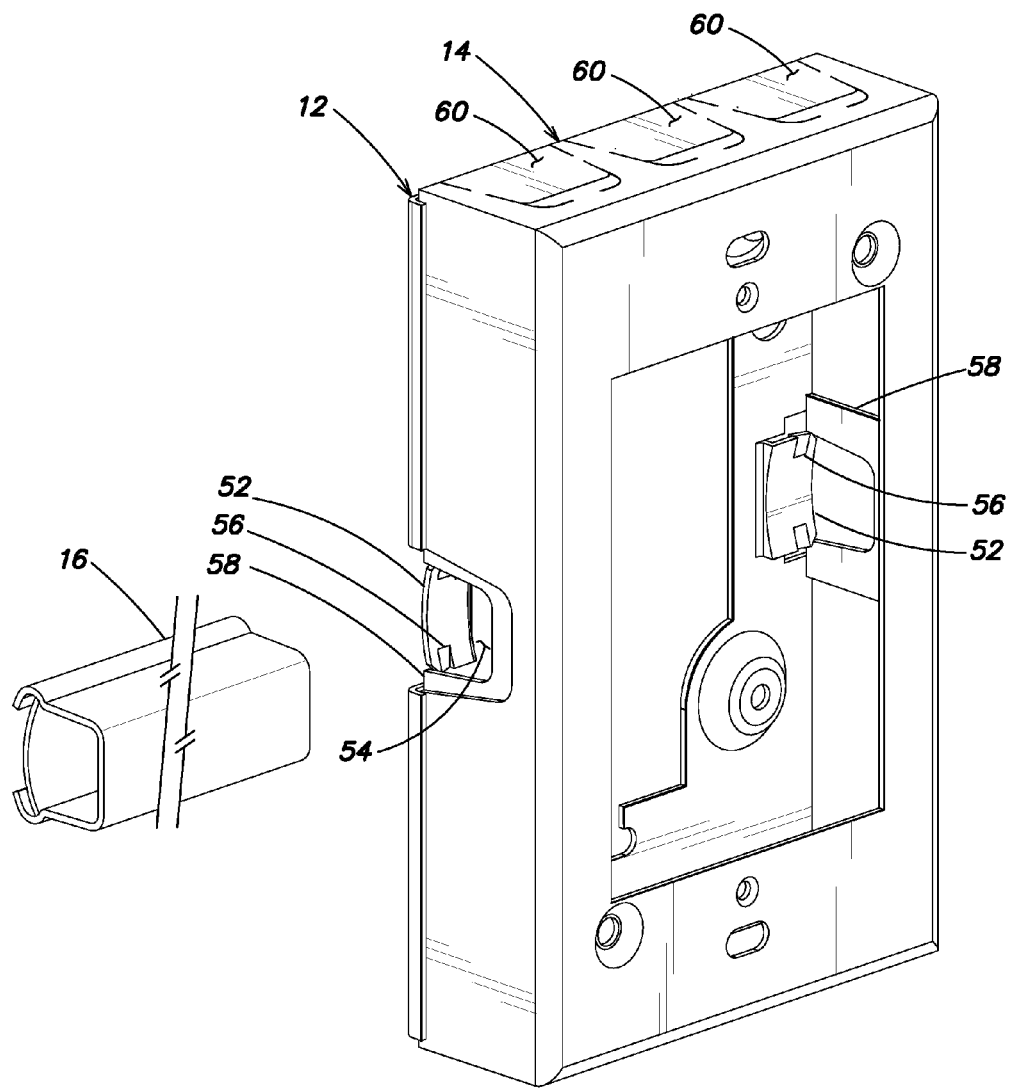
FIG. 10 is a partial perspective view of the third implementation cable conduit electrical box with the cable conduit removed.
Figure 11:
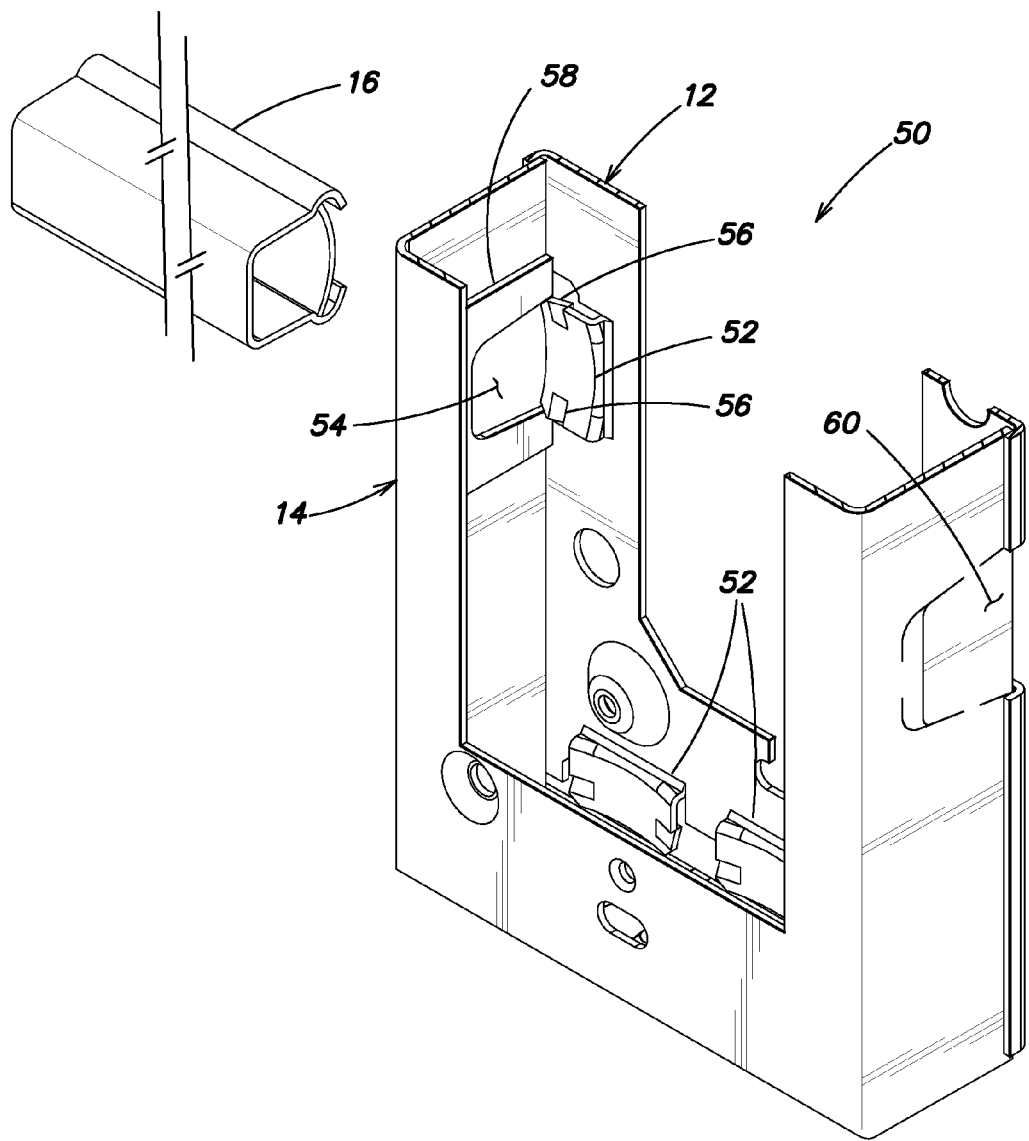
FIG. 11 is partial perspective view of the third implementation cable conduit electrical box with the cable conduit removed and only half of the cable conduit electrical box shown.

FIGS. 9 though 15 illustrate various views of a third implementation cable conduit electrical box 50 similar to the previously described cable conduit electrical boxes. As seen in FIGS. 9-11, cable conduit electrical box 50 includes a plurality of mounting tabs 52 positioned adjacent mounting openings 54. Mounting tabs 52 may each include locking clips 56 arranged to receive and secure cable conduit 16 therein. Specifically, a plurality of mounting tabs 52 are positioned along the perimeter of the electrical box 50 such that the user can selectively position and locate the cable conduit in a desired position with respect to the electrical box. Further, the mounting openings may also include a gasket 58 surrounding the opening and ensuring an airtight seal around the cable conduit and thereby sealing the electrical box from the surrounding room. As also indicated, removable tabs 60 may be selectively removed by the user to locate cable conduit therein and maintain a sealed environment without gasket 58 unless otherwise necessary.

Referring to FIG. 9, cable conduit 16 connects to mounting tab 52 preferably in such a manner that the cable conduit 16 is then difficult to remove once installed. The locking clips 56 assist to frictionally engage the cable conduit in any suitable way. By way of non-limiting example, the cable conduit may be a two piece design with the locking clips 56 and mounting tabs 52 biasing the two piece cable conduit together or apart in an effort to impart additional friction there between. Advantageously, this additional friction assists to maintain the cable conduit in contact with the electrical box.

Figure 12:
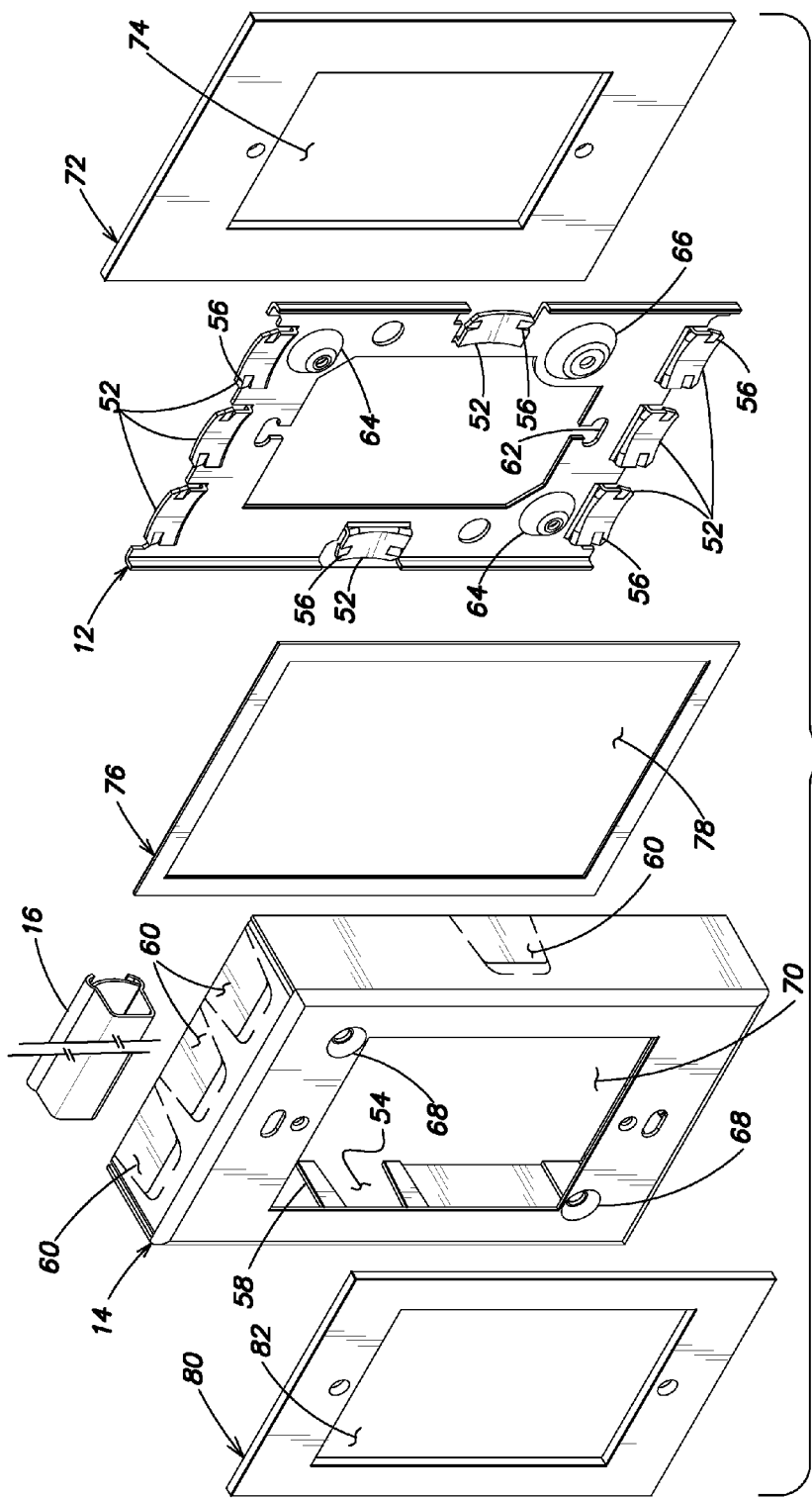
FIG. 12 is an exploded view of the third implementation cable conduit electrical box.

FIG. 12 illustrates an exploded view of cable conduit electrical box 50. Base 12 may also include a pair of electrical box mounting apertures 62 arranged to secure the base 12 to an electrical box or other suitable mounting structure. Base 12 may also include a pair of cover mounting apertures 64 and a grounding aperture 66. The cover mounting apertures 64 in base 12 are preferably aligned with cover apertures 68 so that the cover 14 can be removably secured to base 12. Further, grounding aperture 66 is used, when necessary, to provide an earth ground for the electrical device or switch. The cover 14 may also include a central aperture 70 therein arranged to receive an electrical device or electrical switch.

A rear gasket 72 may include an opening 74 and is arranged to be positioned between a wall or electrical box and the rear side of base 12. Rear gasket 72 provides sealing for the rear portion of the electrical box. Next, a perimeter gasket 76 may also include an opening 78, but perimeter gasket 76 is generally thinner than rear gasket 72. Perimeter gasket 76 functions to seal the inside of the electrical box and particularly below the mounting tabs 52. Advantageously, perimeter gasket 76 seals, with the mounting tabs 52 in combination with gaskets 58, any cable conduit 16 positioned therein. Finally, a forward gasket 80 includes an aperture 82 and is used to secure the area between the cover 14 and a wall plate (not shown) or other suitable cover mechanism. Specifically, gaskets 58, rear gasket 72, perimeter gasket 76, and forward gasket 80 together provide an air tight seal for the cable conduit electrical box 50 regardless of where cable conduit is received within the electrical box.

Figure 13:
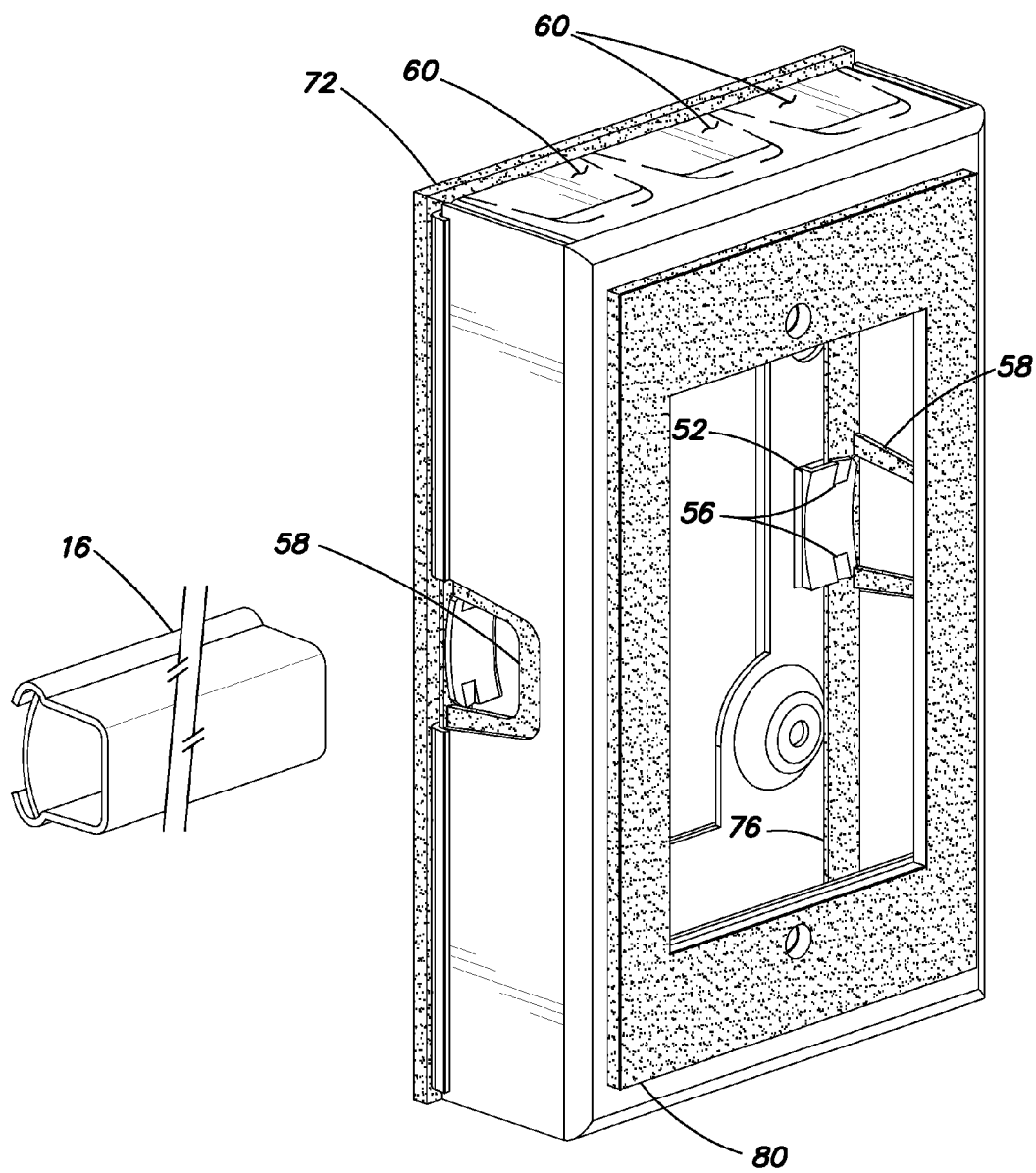
FIG. 13 is a perspective view of the third implementation cable conduit electrical box with gasket materials shaded.
Figure 14:
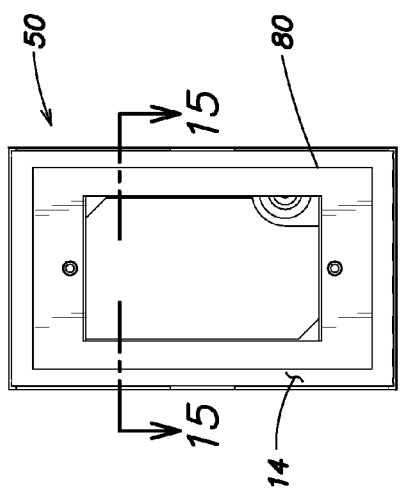
FIG. 14 is a front view of the third implementation cable conduit electrical box fully installed.
Figure 15:
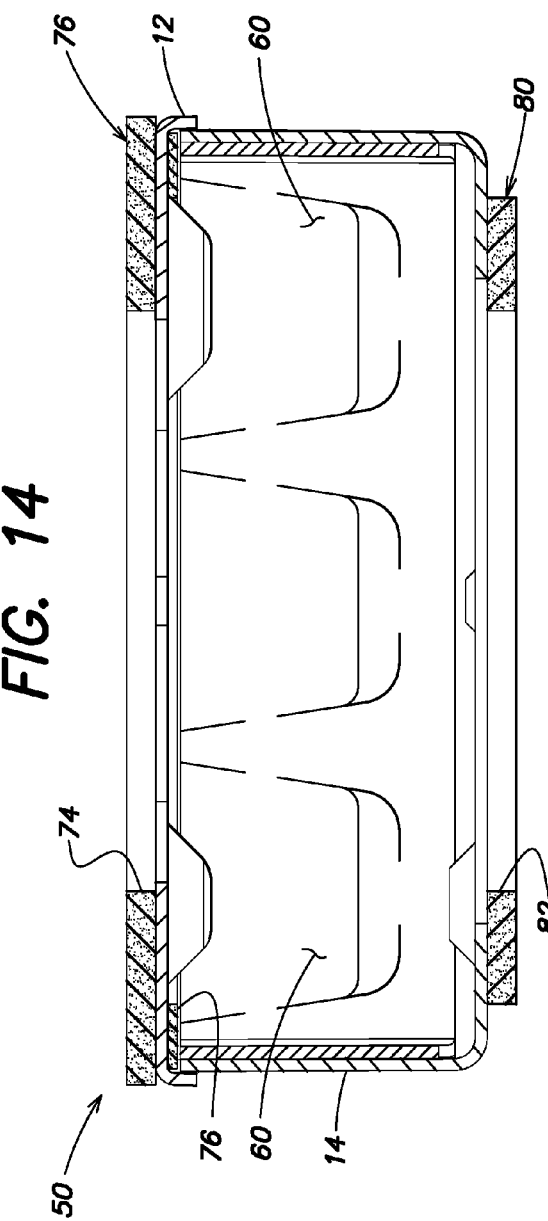
FIG. 15 is a sectional view taken generally about line A-A in FIG. 14 with gasket materials shaded.

FIGS. 13 through 15 illustrates various views of the cable conduit electrical box 50 with the gaskets shaded to better highlight the sealing components within the electrical box. Specifically, the gaskets 58, 72, 76, and 80 are used to seal all accessible and separable components of the electrical box while further allowing the cable conduit to be secured to the electrical box. As can be further seen in FIG. 15, the gasket materials together provide a seal around cable conduit 16 in addition to the open components in the electrical box. The gaskets 58, 72, 76, and 80 may be composed of a foam material, a silicone material, a rubber material, a fiber material, a cork material, a plastic material, or any other suitable material.

It will be understood that implementations are not limited to the specific components disclosed herein, as virtually any components consistent with the intended operation of a method and/or system implementation for a cable conduit electrical box may be utilized. Components may comprise any shape, size, style, type, model, version, class, grade, measurement, concentration, material, weight, quantity, and/or the like consistent with the intended operation of a method and/or system implementation for a cable conduit electrical box.

The concepts disclosed herein are not limited to the specific implementations shown herein. For example, it is specifically contemplated that the components included in a particular implementation of a cable conduit device may be formed of any of many different types of materials or combinations that can readily be formed into shaped objects and that are consistent with the intended operation of a cable conduit electrical box. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments of the cable conduit electrical box may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of a cable conduit electrical box, it should be readily apparent that a number of modifications may be made without departing from the spirit thereof and that these implementations may be applied to other cable conduit electrical boxes. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

We claim:

1. A cable conduit electrical box comprising:
a base having at least one opening for receiving a cable conduit on a wall;
a cover removably attachable to the base and having a central aperture sized and shaped to receive an electrical device or an electrical switch; and,
an adapter removably and replaceably positioned on the base or the cover for sealing the at least one opening around the cable conduit;
wherein the base includes a plurality of mounting pins oriented to receive a mounting aperture of the adapter.

2. The cable conduit electrical box of claim 1 further comprising a gasket positioned around the cable conduit and in contact with the cable conduit once inserted into the at least one opening.

3. The cable conduit electrical box of claim 2 wherein the gasket is composed of a compressible foam.

4. The cable conduit electrical box of claim 1 wherein a gasket is positioned behind the base.

5. The cable conduit electrical box of claim 1 wherein a gasket is positioned between the base and the cover.

6. The cable conduit electrical box of claim 5 wherein the gasket is positioned adjacent a perimeter of the base and the cover.

7. The cable conduit electrical box of claim 6 wherein a gasket is positioned on an outside surface of the cover.

8. The cable conduit electrical box of claim 1 further comprising a rear gasket, a perimeter gasket, a cable conduit gasket, and a forward gasket.

9. The cable conduit electrical box of claim 1 wherein a perimeter gasket is positioned between the base and a mounting tab.

10. A cable conduit electrical box comprising:
a base having at least one opening and at least one mounting tab for receiving a cable conduit on a wall with a first gasket positioned between the wall and a rear surface of the base;
a cover removably attachable to the base and having at least one aperture in a side wall and a central aperture sized and shaped to receive an electrical device or an electrical switch;
a second gasket positioned between the base and the cover at a perimeter of the base and the cover and radially outward of the at least one mounting tab;
a third gasket positioned on the cover side wall in a generally u-shape, surrounding only three sides and extending inward of the at least one aperture to contact the cable conduit when inserted; and,
a fourth gasket positioned on a front surface of the cover and surrounding the central aperture.

11. The cable conduit electrical box of claim 10 wherein the first gasket, the second gasket, the third gasket, and the fourth gasket are composed of a foam material.

12. The cable conduit electrical box of claim 10 further comprising a plurality of mounting tabs on the base each arranged to receive a cable conduit positioned around each of the plurality of mounting tabs.

13. The cable conduit electrical box of claim 10 wherein the second gasket is positioned behind the at least one mounting tab and between the cover, the base, and the at least one mounting tab.

14. The cable conduit electrical box of claim 10 wherein the first gasket, the second gasket, the third gasket, and the fourth gasket are composed of a rubber material.

* * * * *